Patented Mar. 25, 1952

2,590,636

UNITED STATES PATENT OFFICE 2,590,636

KETOHALOGENODIMETHYLPERHYDRO-PHENANTHRENES AND PROCESS OF MAKING SAME

Karl Miescher, Riehen, and Jean-René Billeter, Basel, Switzerland, assignors to Ciba Pharmaceutical Products, Inc., Summit, N. J.

No Drawing. Application September 26, 1949, Serial No. 117,955. In Switzerland October 8, 1948

4 Claims. (Cl. 260—488)

The present invention relates to 1-keto-2-halogeno - 2,13 - dimethyl - perhydrophenanthrenes of the general formula

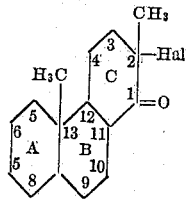

wherein Hal stands for a halogen atom, especially for a bromine atom.

The new halides may contain further substituents, especially in the 7-position a hydroxyl or a substituent convertible into such a group, for example, an etherified or esterified hydroxyl group and also a further halogen atom, for example, in the 14-position. The invention is more especially concerned with the 1-keto-2-bromo-7-hydroxy-2,13-dimethyl-14-perhydrophenanthrene and 1-keto - 2 - bromo - 7 - hydroxy - 14 - chloro - 2,13 - dimethyl-perhydrophenanthrene and the esters and ethers of these bromides, for example, their acetates, propionates or benzoates.

The new compounds are obtained by treating a 1 - keto - 2,13 - dimethyl - perhydrophenanthrene with a halogenating agent.

As starting materials there are used more especially 1 - keto - 2,13 - dimethyl - perhydrophenanthrenes, which contain in the 7-position a hydroxyl or a substituent convertible into such a group, for example, an etherified or esterified hydroxyl group. Also very valuable are those starting materials which contain, in addition to the said substituents and a hydrogen atom in the 2-position, a halogen atom advantageously in the 14-position. Illustrative examples of starting materials according to the invention are 1-keto-7 - hydroxy - 2,13 - dimethyl - perhydrophenanthrene and 1 - keto - 7 - hydroxy - 14 - chloro - 2,13-dimethyl-perhydrophenanthrene and ethers or esters of these compounds, for example, their acetates, propionates or benzoates. These starting materials can be obtained, for example, by the oxidation of sterins and the further conversions by known methods of the compounds so obtained.

For the halogenation there are used especially halogens, such as bromine, in which case it is of advantage to work in an inert solvent, such as ether.

The halides obtained by the present process are valuable intermediate products for the manufacture of therapeutically active compounds.

The following examples illustrate the invention, the parts being by weight:

*Example 1*

1 - keto - 2 - bromo - 7 - acetoxy - 2,13 - dimethyl - 14 - trans-perhydrophenanthrene of the formula

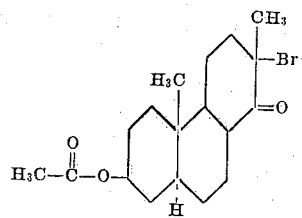

5.5 parts of bromine are added in the course of 30 minutes to a solution of 10 parts of 1-keto-7-acetoxy - 2,13 - dimethyl - 14 - trans - perhydrophenanthrene (having a melting point at 144° C.) in 250 parts of absolute ether, initially at room temperature and subsequently while cooling with ice. After the bromination, the whole is mixed with 200 parts of ice-water, the ethereal solution is washed with an ice-cooled solution of sodium bicarbonate, dried and evaporated, and the residue is recrystallized from methanol or acetone. 1 - keto - 2 - bromo - 7 - acetoxy - 2,13 - dimethyl - 14 - trans - perhydrophenanthrene (having a decomposition point of 134° C.) is obtained in a yield of 80 per cent.

In lieu of the 7-acetoxy-compound as used in the foregoing example, compounds having other acyloxy groups in the 7-position, such as propionyloxy or benzoyloxy groups or a free hydroxyl group may be used as starting material, whereby the 1-keto-7-propionoxy-, 1-keto-7-benzoyloxy-, and 1 - keto - 7 - hydroxy - 2 - bromo - 2,13 - dimethyl - 14 - trans - perhydrophenanthrene, respectively, are obtained.

In the same manner, ethers, especially the 7-alkoxy-compounds, such as the 1-keto-7-methoxy-, 1-keto-7-ethoxy-, 1-keto-7-propyloxy- or 1-keto-7-benzyloxy-2-bromo - 2,13 - dimethyl-14-trans-perhydrophenanthrene may be prepared by starting from the corresponding 1-keto-7-methoxy-, 1-keto-7-ethoxy-, 1-keto-7-propyloxy- or 1-keto-7-benzyloxy- 2,13 -dimethyl-14-trans-perhydrophenanthrene. The latter may be prepared in a manner known as such by converting the 7-hydroxy compound into the 7-halogen-compounds and which in turn are treated with an appropriate alcoholate.

Example 2

1-keto-2-bromo-7-acetoxy - 14 - trans-chloro-2,13 - dimethyl - perhydrophenanthrene of the formula

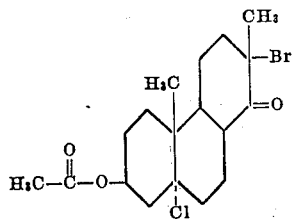

10.5 parts of 1-keto-7-acetoxy-14-trans-chloro-2,13-dimethyl-perhydrophenanthrene are suspended in 150 parts of ether, and halogenated with 5.2 parts of bromine as described in Example 1. The whole is then mixed with water, extracted with ether, and the ethereal solution is washed neutral, dried and evaporated. The 1-keto-2-bromo-7-acetoxy-14-trans-chloro-2,13-dimethyl - perhydrophenanthrene so obtained melts with decomposition at 135° C. after recrystallization from a mixture of acetone and methanol. The yield amounts to 8.5 parts.

The 1-keto-7-acetoxy-14-trans-chloro-2,13-dimethyl-perhydrophenanthrene used as starting material may be obtained by saturating at a low temperature the double bond of the $\Delta^{14,9}$-1-keto-7-acetoxy - 2,13 - dimethyl-dodecahydrophenanthrene with hydrogen chloride dissolved in a mixture of acetic acid and chloroform.

Having thus described the invention, what is claimed is:

1. Process for the manufacture of a ketobromo-dimethyl-perhydrophenanthrene by treating a 1-keto-2,13-dimethyl-perhydrophenanthrene which contains in the 7-position a member selected from the group consisting of free hydroxyl, lower aliphatic acyloxy and lower alkoxy and in 14-position a member selected from the group consisting of hydrogen and chlorine, with bromine in an inert solvent and while cooling with ice, whereby the corresponding 1-keto-2-bromo-2,13-dimethyl-perhydrophenanthrene is preferentially produced.

2. A 1-keto-2-bromo-2,13-dimethyl-perhydrophenanthrene carrying in the 7-position a member selected from the group consisting of hydroxy, lower aliphatic acyloxy and lower alkoxy and in 14-position a member selected from the group consisting of hydrogen and chlorine.

3. 1-keto-2-bromo-7-acetoxy-2,13-dimethyl-14-trans-perhydrophenanthrene.

4. 1-keto-2-bromo-7-acetoxy- 14 -trans-chloro-2,13-dimethyl-perhydrophenanthrene.

KARL MIESCHER.
JEAN-RENÉ BILLETER.

REFERENCES CITED

The following references are of record in the file of this patent:

UNITED STATES PATENTS

| Number | Name | Date |
| --- | --- | --- |
| 2,116,893 | Heisel | May 10, 1938 |
| 2,260,328 | Meiescher et al. | Oct. 28, 1941 |
| 2,528,001 | Johnson et al. | Oct. 31, 1950 |

OTHER REFERENCES

Achtermann: Zeit. physiol. Chem., vol. 225, pp. 141–144 (1934).

Koster et al.: Berichte, vol. 73, pp. 298–304 (1940).